(No Model.) 3 Sheets—Sheet 1.

H. S. PRUYN.
SUPPLY SYSTEM FOR ELECTRIC RAILWAYS.

No. 513,440. Patented Jan. 23, 1894.

(No Model.) 3 Sheets—Sheet 2.

H. S. PRUYN.
SUPPLY SYSTEM FOR ELECTRIC RAILWAYS.

No. 513,440. Patented Jan. 23, 1894.

WITNESSES:
J. E. Storey
C. V. Edwards

INVENTOR
Henry S. Pruyn
BY
Wm. A. Rosenbaum
ATTORNEY (No Model.) 3 Sheets—Sheet 3.

H. S. PRUYN.
SUPPLY SYSTEM FOR ELECTRIC RAILWAYS.

No. 513,440. Patented Jan. 23, 1894.

WITNESSES:
J. E. Story
C. V. Edwards.

INVENTOR
Henry S. Pruyn
BY
Wm. A. Rosenbaum
ATTORNEY

THE NATIONAL LITHOGRAPHING COMPANY,
WASHINGTON, D. C.

UNITED STATES PATENT OFFICE.

HENRY S. PRUYN, OF HOOSICK FALLS, NEW YORK, ASSIGNOR TO JAMES S. GIBBS, OF CHICAGO, ILLINOIS.

SUPPLY SYSTEM FOR ELECTRIC RAILWAYS.

SPECIFICATION forming part of Letters Patent No. 513,440, dated January 23, 1894.

Application filed September 16, 1893. Serial No. 485,693. (No model.)

*To all whom it may concern:*

Be it known that I, HENRY S. PRUYN, a citizen of the United States, residing at Hoosick Falls, in the county of Rensselaer and State of New York, have invented certain new and useful Improvements in Electric Railways, of which the following is a full, clear, and exact description.

This invention relates to electric railways and has special reference to conduit driving systems in which main and secondary conductors are utilized.

The object of the invention is to provide a construction which will permit of the smallest amount of leakage of the current and in which the mechanical construction is such as to be an eminently practical and successfully operating system.

The invention consists of the details of construction and method of mounting and insulating the conductors in the conduit, and also of a special form of trolley or collecting device to be carried by the moving car.

The invention will be described with reference to the accompanying drawings in which—

Figure 1:
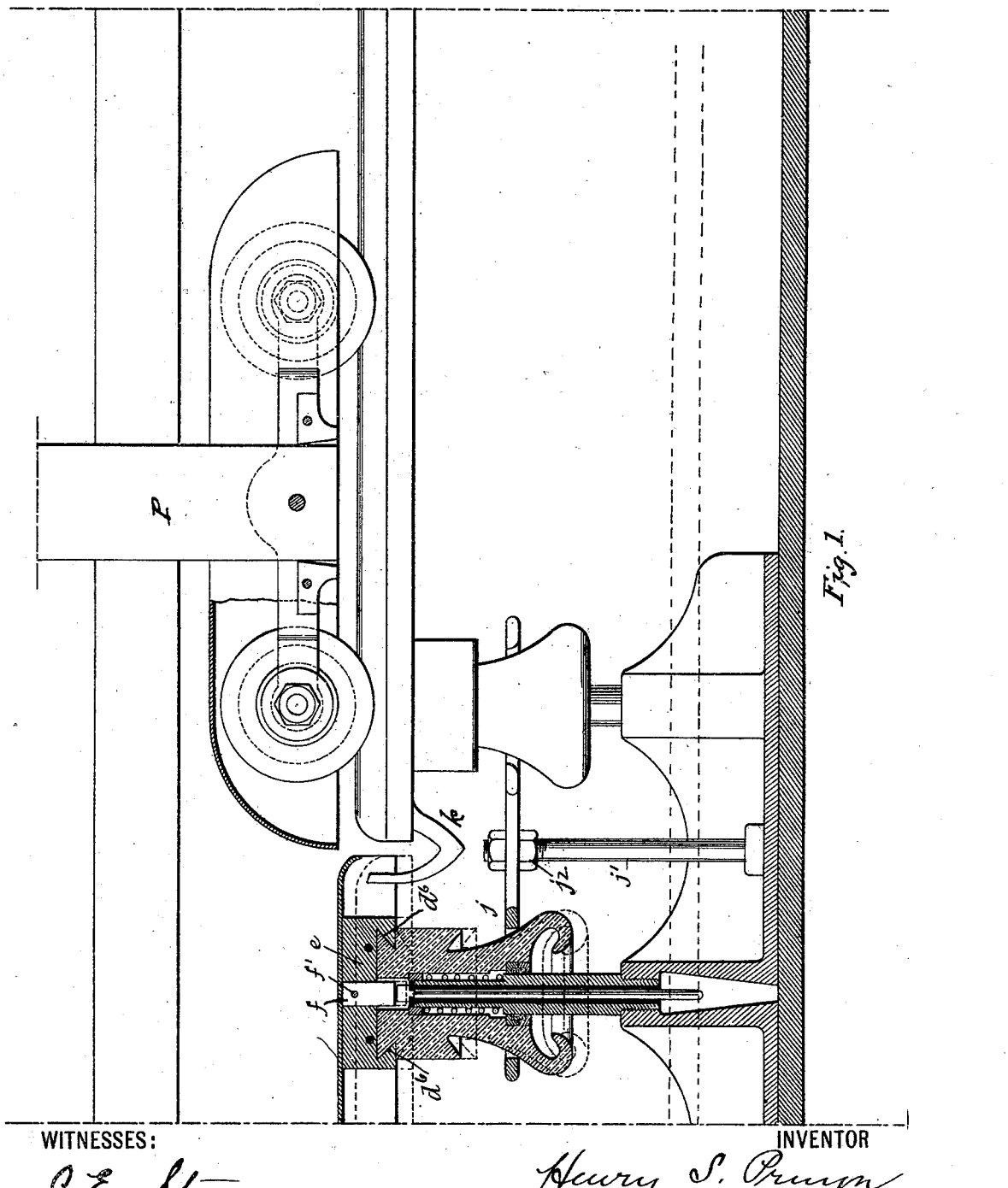
Figure 2:
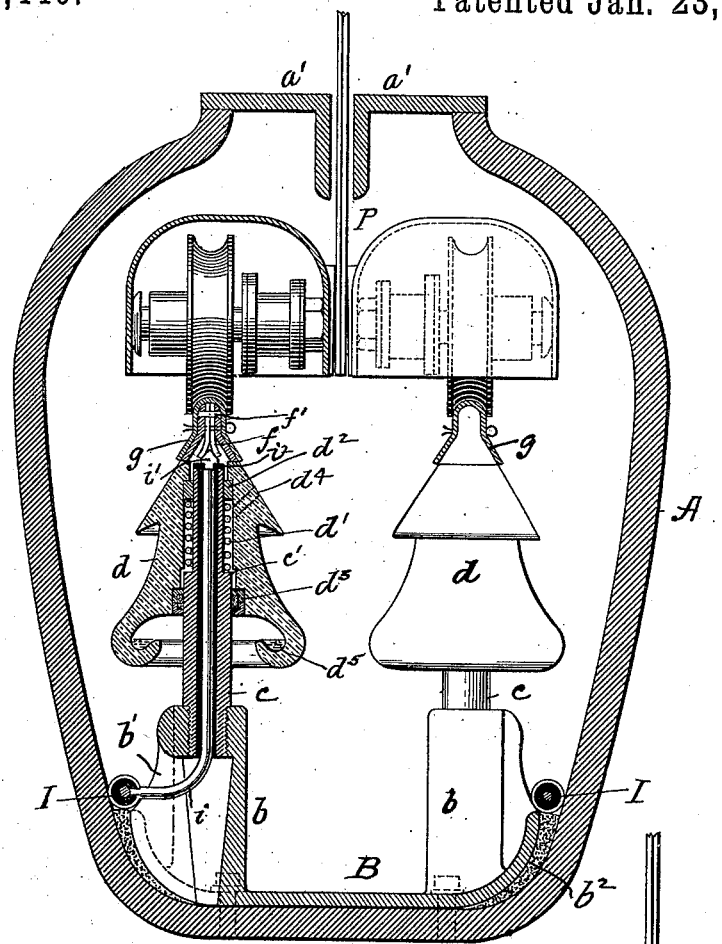
Figure 5:
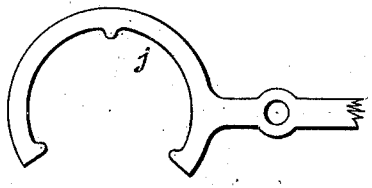
Figure 4:
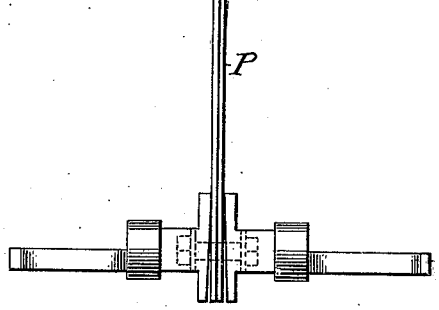
Figure 5:
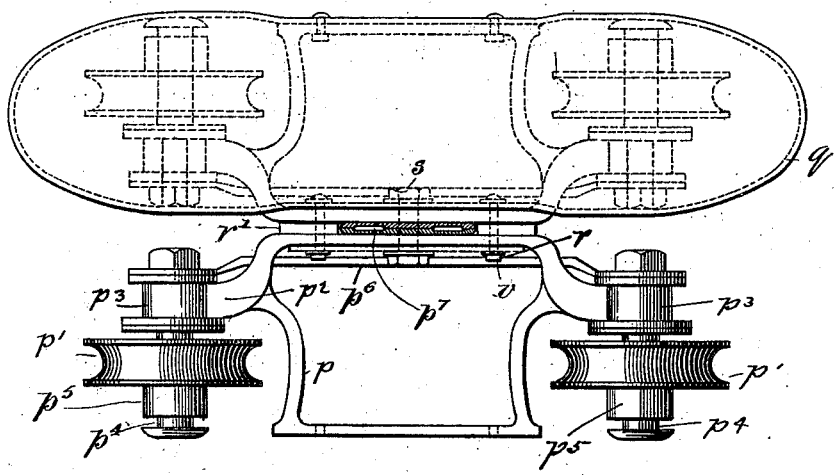
Figures 6, 7:
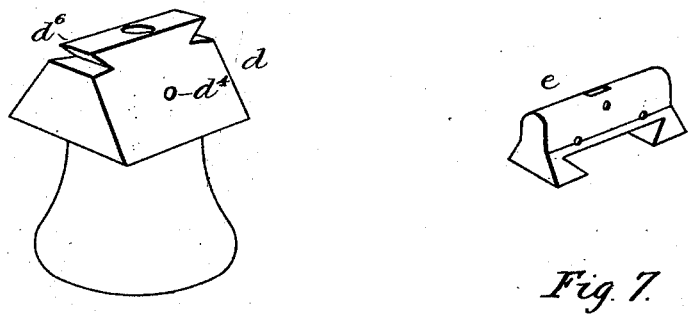

Figure 1 represents a longitudinal section of the conduit showing some of the parts in elevation. Fig. 2 is a transverse section of the same. Fig. 3 is a plan of the trolley or current collector with one of its hoods removed. Fig. 4 is a detail of the trolley. Fig. 5 is a partial plan of a stop to be referred to. Fig. 6 is a perspective view of one of the insulators; and Fig. 7 is a similar view of an attachment to the insulator.

The conduit is represented by the letter A. It may be made of any desired shape or construction and is to be provided with the usual slot rails $a'$, forming the slot through which the plow or arm carried by the car projects. Along the bottom of the conduit are secured at intervals in any suitable manner castings or base pieces B, each of which is provided with four upwardly projecting hollow pillars $b$, the upper ends of which are interiorly screw threaded. The chambers in these pillars communicate with the conduit through lateral passages $b'$. In case the lower corners of the conduit are rounded the side flanges or edges of the castings will be turned up as shown at $b^2$ and the width of the castings will be slightly less than the width of the conduit at the bottom to allow for lateral adjustment of the castings to get them into alignment. The space between the edges of the castings and the conduit is then filled with cement or other suitable material. These castings, of course, may have perfectly flat bases to rest upon the floor of a correspondingly formed conduit.

In the upper end of each pillar $b$ is screwed a post $c$ which makes a firm connection therewith. This post is hollow or tubular and its upper end is of less exterior diameter than its lower end, thus forming a shoulder $c'$.

On each post is fitted an insulator $d$ of porcelain, glass or other suitable material. The insulator is provided with a central vertical passage in which is located the post $c$. The diameter of the passage in the insulator is greater than the diameter of the post, so that an annular chamber is formed between these two parts and in this chamber is located a spiral spring $d'$, which bears at one end against the shoulder $c'$ and at the other end against a collar $d^2$ of insulating material. The collar is carried by the insulator so that the action of the spring is to hold the insulator in an elevated position. This collar also forms a bearing and guide for the insulator when it slides in the manner hereinafter described. A second bearing for the insulator is formed by the two parts of the stuffing box $d^3$ located at the lower end of the passage and surrounding the larger portion of the post. The chamber in which the spring is to be located is to be filled with oil of suitable kind, the purpose of which is to lubricate the bearings of the insulator and to exclude moisture from the interior parts. The oil will be supplied through the passage $d^4$ shown in dotted lines in Fig. 2. The stuffing box $d^3$ will not be perfectly tight, but will permit a small quantity of oil to ooze through on to the surface of the post below the insulator and on to the bottom of the insulator itself, thus protecting these parts from moisture and preventing any escape of current from a collection of the same at these places. The exterior shape of the insulators will be substantially that of a double cone, or two petticoats, both edges of which will shed water or other material falling upon them. The lower edge will be turned inward, as shown, to form an interior annular channel $d^5$ which will receive oil escaping from the chamber in the insulator. This channel of oil will form an effectual bar against creeping moisture. The upper end of the insulator is formed with two, flat inclined surfaces located opposite each other and similar in shape to the roof of a house, and at the extreme top are formed two undercut notches $d^6$, into which is fitted a metallic block $e$ having corresponding formations which together form a dovetailed connection. This block has two sides shaped as extensions of the flat sides of the insulator, but along its upper ridge it is curved into the form of an inverted U.

Centrally and directly over the central passage in the insulator the block is provided with a chamber in which is secured two metallic strips $f$ projecting downward toward the head of post $c$ and at their lower ends are slightly separated to form a V shaped space, the purpose of which will hereinafter appear. These metallic pieces or blocks are held in place by a rivet $f'$.

The metallic blocks $e$ form saddles which support electrical conductors $g$. These are shaped in cross section to fit closely over the metallic blocks. Two insulators will be used to support each section. One insulator will be located at each extremity of the section, unless more are found necessary to properly support the section. The sections are insulated from each other by a small air space and as the insulators occur in groups at the joints of the sections they may be supported by a single casting B. I have preferred to describe and illustrate the system as using two metallic circuits. There will, therefore, be two lines of sections arranged parallel to each other in the conduit and four insulators will be located at each joint between the sections.

I, I, are the two main conductors or feeders. They will be heavily insulated and sheathed and may lie directly upon the bottom of the conduit or disposed in any other manner desired. At each insulator a branch conductor $i$ is led off from the main conductor through a lateral passage $b'$ and up through the passage in the post $c$ to the upper end thereof where it terminates in a wedge shaped metallic block $i'$. This branch conductor is insulated from the tube throughout and a washer $i^2$ of insulating material is interposed between the wedge and the head of the post. The wedge stands directly below the lower separated ends of the blades $f$. When sufficient pressure is brought to bear upon the conductor sections $g$ the entire section and the insulators are forced downward, the insulators sliding upon the posts $c$, and the blades $f$ are caused to make a rubbing electrical contact with the wedges $i'$. This permits current to flow from the main conductors to the sections $g$. When the pressure is removed from the section the spiral springs $d'$ lift the insulators and the section to their normal positions. The upward movement of the insulator is limited by a horizontal jaw $j$ which is secured to a post $j'$ and surrounds the lower portion of the insulator. It is provided with three points as shown in Fig. 5 which strike the surface of the insulator at a certain plane and limit its movement. These stops may be adjusted to any elevation by means of the nuts $j^2$ securing them to the posts.

I propose to use for a collecting device a trolley carried by a car and rolling upon the sections $g$. As it passes along its weight will press the sections down and thus close the circuit in the manner described, to the motor on the vehicle. In order that there shall be no jolting when the trolley runs from one section on to the next I have provided means for slightly lowering the forward section before the trolley strikes it. This consists of a bent arm $k$ rigidly attached to the extreme end of one section and passing under the end of the next adjacent section. Normally there is a slight distance between the end of this arm and the section, so that the latter will have a slight movement independent of the arm. As the sections are of considerable length the rear end will be pushed down first and the forward end will be gradually carried downward as the trolley approaches it. When the trolley has traveled past the middle point of the section the forward end is forced fully down and in doing this it strikes the end of the arm $k$ and also forces the rear end of the section ahead downward about half way; the end of the forward section will, therefore, not seriously obstruct the passage of the trolley wheel when it strikes it and the motion throughout will be wavelike.

P represents the plow or arm connected with the car and extending through the slot into the conduit. At its lower end it carries two frames $p$, one upon each side, and each frame supports two collecting wheels $p'$ which run upon the sectional conductor $g$. The wheels are grooved to fit the conductor. They are arranged in line with each other, one forward and one back on the frame $p$. The frame carries two projections $p^2$, at the ends of which hubs $p^3$ are formed, in which the axles $p^4$ carrying the wheels are rigidly mounted. The wheels thus are provided with elongated hubs $p^5$ and they are permitted to slide longitudinally along the axles to be able to follow inaccuracies in the sectional conductor, and also, so that the wheels may change their position with respect to each other when going around curves. The current which the wheels take from the sectional conductor is carried along the axles to the strip $p^6$ which is connected in any suitable manner with a wire which leads up through one of the passages $p^7$ through the plow to the motor on the car.

In order to protect the wheels from moisture and dirt which may fall through the slot they are covered by two hoods $q$ made of micanite or other suitable insulating material. The edges of these hoods are secured to the outer and inner sides of the frame in the manner shown in Fig. 3. The two parts of the frame are secured together by bolts $r$, which also clamp in place spacing blocks $r'$. These blocks separate the parts of the frame sufficiently to admit the end of the plow beneath, and the plow which is pivoted in the frame by the single bolt $s$ is permitted to swing fore and aft by forming the spacing blocks on an angle as shown in Fig. 1. The plow is also permitted to swing laterally by forming the sides of the frame $p$ oblique thereto, as shown in Fig. 4. The entire trolley, therefore, has the greatest freedom of movement and is not subject to strains due to irregular movements of the car, or to irregularities in the sectional conductor over which it travels.

An important feature in the construction is the shape of the bottom of the insulators; it will be observed that they are concaved and that the lip forming the oil channel extends upward some distance. The purpose of this is to prevent water from reaching the stuffing box and the under surface of the insulator if the conduit should become flooded. It will be observed that the rising water would confine the air under the insulator, and its resistance would be sufficient to exclude the water.

Although the drawings and description of my invention set forth the system as used in connection with a conduit, it is obvious that the entire apparatus constituting the invention may be used directly upon the surface of the ground or upon an elevated structure where it would be mounted and secured to the ties, or in any other desired manner. In this case the insulators supporting the sectional conductor might be mounted upon the same base pieces or connected more directly to the ties themselves. It is therefore to be understood that the claims herein are not limited in any way to the conduit system.

Having thus described my invention, I claim—

1. In an electric railway system, the combination of a main continuous conductor, a working sectional conductor, branch conductors from the main to the sectional conductor, spring mounted insulators supporting the sectional conductor, said insulators containing oil chambers, for the purpose set forth.

2. In an electric railway system, a sectional working conductor, in combination with insulators supporting the same and posts upon which the insulators are mounted and adapted to slide, an oil chamber being formed between the insulator and the post, for the purpose set forth.

3. In an electric railway system, a sectional working conductor, in combination with insulators supporting the same and posts upon which the insulators are mounted and adapted to slide, an oil chamber being formed between the insulator and the post and a spring located in the oil chamber and supporting the insulator, as set forth.

4. In an electric railway system, the combination of a main conductor, a movable sectional working conductor, insulators carrying the working conductor, hollow posts supporting the insulators, and branch circuits from the main to the working conductor extending through the hollow posts, substantially as described.

5. In an electric railway system, the combination of a main conductor, a movable sectional working conductor, insulators carrying the working conductor, hollow posts supporting the insulators, and upon which they are adapted to slide, branch circuits from the main to the working conductor extending through the hollow posts and two contact points carried respectively by the insulator and the posts arranged to make and break the branch circuit, as described.

6. In an electric railway system, the combination of a working conductor, vertically arranged insulators supporting the same, posts supporting the insulators, an oil chamber being formed between the post and the insulator, and an annular interior oil channel arranged around the lower edge of the insulator for the purpose set forth.

7. The combination of a working conductor, an insulator supporting the same, a post supporting the insulator and two bearings between the insulator and post, an oil chamber being formed between the bearings and the insulator adapted to slide in its bearings on the post.

8. The combination of a working conductor, an insulator supporting the same, a post supporting the insulator and two bearings between the insulator and post, an oil chamber being formed between the bearings and the insulator adapted to slide in its bearings on the post, one of said bearings being constructed to permit the escape of oil from the chamber in a limited quantity.

9. The combination with a conduit, of a sectional working conductor located therein, insulators supporting the sections of the conductor and located at or adjacent to the ends thereof and base pieces detachably connected with the conduit, and upon which the adjacent insulators are supported.

10. The combination of the main and sectional conductors, the base pieces B and the conduit, the base pieces provided with hollow pieces communicating with the conduit through lateral passages, hollow posts screwed into the ends of said pillars, insulators fixed upon said posts and carrying the sectional conductor, and branch conductors from the main to the sectional conductor extending through the lateral passages, hollow pillars and hollow posts, substantially as described.

11. The combination of a conduit, an electrical conductor located therein, insulators vertically supported, to which the conductor is attached and vertical posts supporting the insulators, the bottom of the insulators being concaved for the purpose set forth.

In testimony whereof I subscribe my signature in presence of two witnesses.

HENRY S. PRUYN.

Witnesses:
MARY J. RICHMOND,
JAMES CLAIR.